(12) United States Patent
Nelson

(10) Patent No.: US 8,275,077 B1
(45) Date of Patent: Sep. 25, 2012

(54) COHERENT DEMODULATION OF AIS-GMSK SIGNALS IN CO-CHANNEL

(75) Inventor: Douglas J. Nelson, Columbia, MD (US)

(73) Assignee: The United States of America as Represented by the Director, National Security Agency, Washington, DC (US)

( * ) Notice: Subject to any disclaimer, the term of this patent is extended or adjusted under 35 U.S.C. 154(b) by 164 days.

(21) Appl. No.: 12/925,395

(22) Filed: Oct. 13, 2010

(51) Int. Cl.
*H03D 1/00* (2006.01)
*H04L 27/06* (2006.01)

(52) U.S. Cl. ........ 375/341; 375/262; 375/325; 375/326; 375/343

(58) Field of Classification Search .................. 375/130, 375/140–143, 147, 150, 259–262, 271–274, 375/278, 285, 316, 322, 324–336
See application file for complete search history.

(56) References Cited

U.S. PATENT DOCUMENTS

| | | | | |
|---|---|---|---|---|
| 4,583,048 A * | 4/1986 | Gumacos et al. | ............. | 329/302 |
| 5,063,574 A * | 11/1991 | Moose | ........................ | 375/244 |
| 5,596,601 A * | 1/1997 | Bar-David | ..................... | 375/143 |
| 5,623,511 A * | 4/1997 | Bar-David et al. | ............ | 375/143 |
| 6,891,881 B2 * | 5/2005 | Trachewsky et al. | ......... | 375/143 |
| 7,302,233 B2 * | 11/2007 | Onggosanusi et al. | ..... | 455/67.13 |
| 7,444,128 B1 * | 10/2008 | Nelson | ....................... | 455/226.1 |
| 7,457,756 B1 * | 11/2008 | Nelson et al. | ................ | 704/276 |
| 7,492,814 B1 * | 2/2009 | Nelson | ........................... | 375/227 |
| 7,545,325 B1 * | 6/2009 | Nelson et al. | ................ | 342/387 |
| 7,755,536 B1 * | 7/2010 | Nelson et al. | ................ | 342/109 |
| 2009/0196331 A1 * | 8/2009 | Kobayashi et al. | ........... | 375/150 |

* cited by examiner

*Primary Examiner* — David C. Payne
*Assistant Examiner* — James M Perez
(74) *Attorney, Agent, or Firm* — Roshni Kurian

(57) ABSTRACT

The present invention pertains to demodulation of GMSK signals by estimating a carrier frequency of the signal having a carrier residual, basebanding the signal, tracking the signal's carrier frequency, removing the carrier residual, detecting a data burst, generating a bank of poly-bit matched filters, applying the bank of poly-bit matched filters to the signal, determining a magnitude and phase of the output of each poly-bit filter of the bank of poly-bit matched filters, determining a maximum magnitude, determining the location of a baud center, generating a plurality of correlation signals by applying the bank of poly-bit matched filters at the baud center, estimating a carrier phase, removing the estimated carrier phase, applying a Viterbi decoding algorithm to the signal, and estimating the transmitted data sequence.

1 Claim, 1 Drawing Sheet

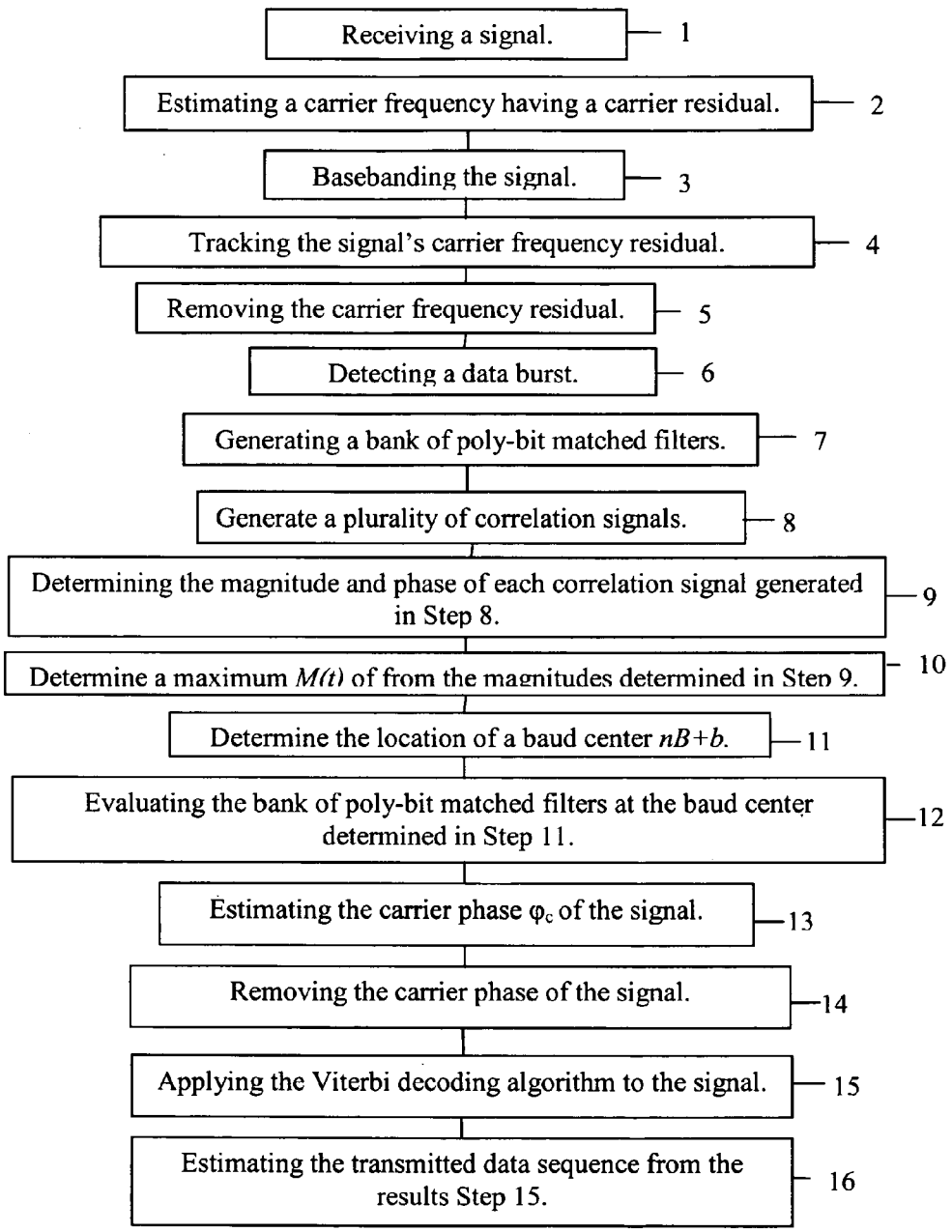

COHERENT DEMODULATION OF AIS-GMSK SIGNALS IN CO-CHANNEL

FIELD OF INVENTION

The present invention pertains to demodulation, and in particular to demodulation of Gaussian minimum shift keyed signals.

BACKGROUND OF THE INVENTION

U.S. Pat. No. 7,302,233, entitled "Multiuser Detection for Wireless Communications Systems in the Presence of Interference," discloses a system and method for detecting transmissions from multiple users in a digital wireless communications system in the presence of interference. The prior art requires training sequences that are unique to specific users. It then attempts to equalize a channel for each user and recovers the information from the equalizer. Multiple data streams are recovered by the process of estimating the signal for each user and subtracting it from the received signal. The resulting signal is then processed to try to recover data from another user. In contrast, the present invention does not require training codes and does not utilize an equalizer. U.S. Pat. No. 7,302,233 is hereby incorporated by reference into the specification of the present invention.

The prior art also includes a paper entitled "A comparison of two methods for demodulating a target AIS signal through a collision with an interfering AIS signal". The prior art taught in this article requires the use of a completely different set of filters. In addition, the prior art requires equalization and preamble codes that are unique to users. In contrast, the present invention does not require these codes. The article is hereby incorporated by reference into the specification of the present invention.

SUMMARY OF THE INVENTION

An object of the present invention is to present a new coherent GMSK demodulator that improves performance.

Another object of the present invention is to present a method of GMSK demodulation that is more intuitive than the conventional approach.

The present invention is a method of demodulating a signal as follows:

The first step is receiving a signal.

The second step is estimating a carrier frequency of the signal having a carrier residual.

The third step is basebanding the signal.

The fourth step is tracking the signal's carrier frequency residual.

The fifth step is removing the carrier frequency residual that may be present.

The sixth step is detecting a data burst.

The seventh step is generating a bank of poly-bit matched filters.

The eighth step is generating a plurality of correlation signals by applying the bank of poly-bit matched filters to the signal.

The ninth step is determining a magnitude and phase of each correlation signal generated in the previous step.

The tenth step is determining a maximum M(t) of from the magnitudes determined in the previous step.

The eleventh step is determining the location of a baud center nB+b.

The twelfth step is evaluating the bank of poly-bit matched filters at the baud center determined in the previous step.

The thirteenth step is estimating a carrier phase $\phi_c$ of the signal.

The fourteenth step is removing the estimated carrier phase of the signal.

The fifteenth step is applying the Viterbi decoding algorithm to the signal.

The sixteenth step is estimating the transmitted data sequence from the results of the previous step.

BRIEF DESCRIPTION OF THE DRAWINGS

FIG. 1 is a flowchart depicting the entire method.

DETAILED DESCRIPTION

The present invention is a new coherent GMSK demodulator that improves performance.

FIG. 1 depicts a method of GMSK demodulation that is more intuitive than the conventional approach.

The first step is receiving a signal 1. The signal is sampled and is converted to an analytic signal using the standard Hilbert transform.

Next, estimate a carrier frequency of the signal having a carrier residual 2. The carrier is estimated by squaring the analytic signal. For GMSK signals, sub-carriers artifacts are observed in the spectrum of the squared signal. These artifacts are observed as subcarrier spectral tones at frequencies equal to twice the carrier frequency plus one half the baud rate and twice the carrier frequency minus one half the baud rate. The sub-carriers are then estimated as one half of the frequencies of the observed tones. In this case, to determine the carrier frequency of the received signal, first estimate the frequencies of the sub-carrier frequencies and then determining the average of the frequencies of these sub-carrier frequencies. In the preferred embodiment, these frequencies are estimated from a cross-spectrum. In an alternate embodiment, the sub-carrier frequencies may be estimated by conventional methods from the bin numbers of the detected sub-carriers in the Fourier spectrum. The cross spectrum is defined as the product of the Fourier transform of the signal and the complex conjugate of the Fourier transform of the signal delayed by one sample. This is mathematically represented by:

$$S(\omega, T) = \int s(t+T)h(t)e^{-i\omega t}dt$$

$$CS(\omega, T) = S\left(\omega, T+\frac{1}{2}\right)S^*\left(\omega, T-\frac{1}{2}\right)$$

$$\Omega(\omega, T) = \arg\{CS(\omega, T)\} \approx \frac{\partial}{\partial T}\arg\{S(\omega, T)\}$$

$$F(\omega, T) = \frac{F_s}{2\pi}\Omega(\omega, T),$$

where CS is the cross-spectrum, $\Omega$ is the frequency in radians/sec, F is the frequency in Hertz, and $F_s$ is the sample rate of the signal in Hertz.

Note that the process used in the preferred embodiment is more accurate than the conventional method used in the alternative embodiment.

The next step is basebanding the signal 3. Basebanding is the process of translating the signal to baseband. Here, the signal is basebanded by multiplying the complex valued received signal by $e^{-i'\Omega t}$, where $'\Omega$ is the estimated carrier frequency. This is represented by:

$s_B(t)=s(t)e^{-i'\Omega t}$, where $s_B(t)$ is the baseband signal, and s(t) is the received signal.

The fourth step of the method is tracking the signal's carrier frequency residual 4. This is accomplished by first assuming a baud rate. In the preferred embodiment, the baud rate is either assumed to be known or is estimated as two times the difference between the higher subcarrier frequency and the lower subcarrier frequency. Next, estimate the instantaneous carrier frequency at several time intervals using the same cross spectral process describe before. The signal's carrier frequency is then tracked by fitting it to a low-degree polynomial.

In an alternate embodiment, the instantaneous carrier frequency may be estimated as the time-varying average of the instantaneous lower sub-carrier frequency and the upper sub-carrier frequency.

Next, remove the carrier frequency residual 5 that may be present by multiplying the complex valued baseband signal by $e^{-iP(t)t}$, where P(t) is a polynomial approximation of the residual instantaneous frequency evaluated at time t.

The next step is to detect a data burst 6. For many GSMK signals, there is a training sequence consisting of a known sequence of transmitted bits. This training sequence can be synthesized by generating the sequence of bits represented by the training sequence and applying the GMSK modulation process to generate a filter matched to the training sequence. The baseband signal is then cross-correlated with the matched filter to detect the location of the training sequence in the sampled signal which represents the location of the data burst.

The seventh step is to generate a bank of poly-bit matched filters 7. The bank of poly-bit matched filters is generated 7 by first generating all possible binary sequences of desired length N. The number of such filters then is equal to $2^N$. The poly-bit matched filters are then generated by applying the GMSK modulation process to each of the N-bit sequences.

Next, generate a plurality of correlation signals by applying the bank of poly-bit matched filters to the signal 8 by cross-correlating the signal with each of the filters. This results in $2^N$ correlation signals, $F_n(t)$.

Then determine a magnitude and phase of each correlation signal of the 2N correlation signals 9.

Additionally, determine a maximum M(t) 10, where M(t) is the maximum at each time, t, of the magnitudes of all correlation signals.

Next, determine the location of a baud center kB+b, where b is defined as a constant, k is defined as the index of the $k^{th}$ baud, and B is defined as the baud length which is equal to the reciprocal of the baud rate 11. Note that b is a number between zero and B for which the sum of M(kB+b) is maximized. In the preferred embodiment, b is estimated by averaging M(kB+x), where for each value of x between zero and B, M(kB+x) is averaged over values of k between zero and K. The constant b, is the value of x for which maximizes the averages of M(kB+x). This is mathematically represented by:

$$b = \mathrm{argmax}_x \sum_k M(kB + x), \quad 0 \le x \le B$$

Then apply the bank of poly-bit matched filters at the baud center 12 determined in the previous step. This is computed by evaluating each filter output, $F_n(t)$, at times $t_k$=kB+b.

The next step is to estimate a carrier phase $\phi_c$ of the signal 13. The correlation signals are complex valued. At the baud center, the correlation signal with the largest magnitude is represented by:

$F_{n(k)}(kB+b) = M(kB+b)e^{i\phi(k)}$, where n(k) is the index of the filter output with the largest magnitude at time, kB+b.

For each k, the expected value of $\phi(k)$ is $\phi(k)=\phi_c+m_k\pi/4$, where $m_k$ is an integer. In the preferred embodiment, the carrier phase, $\phi_c$, may be estimated as the argument (angle) of the average of $e^{4i\phi(k)}$.

The next step is to remove the estimated carrier phase from the correlation signals 14 by multiplying each correlation signal at each time by $\exp(-i\phi_c)$, to produce N rotated correlation functions $f_n(kB+b)=F_n(kB+b)\exp(-i\phi_c)$.

Finally, apply the Viterbi decoding algorithm to the signal 15. The Viterbi decoding algorithm is an efficient method for determining the most likely state sequence in a hidden Markov Model (HMM), given a set of observations. The basis of the algorithm is that the probability/likelihood of each path ending at a particular state is the product of the path probability into its previous state, the probability of transitioning from the previous state to the current state and the probability of the current state given the observation. The Viterbi algorithm discards all but the most likely path into each state, making it computationally and memory efficient.

In the preferred embodiment, the N correlation states are the n-bit binary patterns represented by the N poly-bit matched filters, and the phase states are the possible expected phases of $f_n(kB+b)$, which may have the values 0, $\pi/2$, $-\pi/2$, or $\pi$. For GMSK signals, the signal at time, kB+b, having a correlation state $(\beta_1(k), \ldots, \beta_N(k))$ can transition, at time, (k+1)B+b, to a correlation state $(\beta_2(k), \ldots, \beta_N(k),0)$ or a correlation state $(\beta_2(k), \ldots, \beta_N(k),1)$, where each $\beta_n(k)$ is a binary bit with the value zero or one. No other correlation state transitions are possible. From time kB+b to time (k+1)B+b, the signal may transition from phase state $\phi$ to phase state $\phi+\pi/2 \pmod{2\pi}$ or phase state $\phi-\pi/2 \pmod{2\pi}$. Those of reasonable knowledge in the use of Viterbi decoding will understand the implementation of the Viterbi algorithm with these conditions.

Finally, the Viterbi algorithm results in the most likely sequence of correlation states from which the transmitted data sequence can be estimated as the value of the center bit of each state 16.

While the preferred embodiment has been disclosed and illustrated, a variety of substitutions and modifications can be made to the present invention without departing from the scope of the invention.

What is claimed is:

1. A method of demodulating a signal, comprising the steps of:
   a) receiving said signal including a carrier;
   b) estimating a carrier frequency having a carrier residual;
   c) basebanding said signal;
   d) tracking said carrier frequency having said carrier residual;
   e) removing said carrier residual from the baseband signal;
   f) detecting a data burst signal from the results of step (e);
   g) generating a bank of poly-bit matched filters;
   h) generating a plurality of correlation signals by applying said bank of poly-bit matched filters to said signal detected in step (f);
   i) determining a magnitude and a phase of each correlation signal of said correlation signals generated in step (h);
   j) determining a maximum M(t) of said magnitudes determined in step (i);
   k) determining a location of a baud center nB+b;
   l) evaluating said bank of poly-bit matched filters at said baud center determined in step (k);
   m) estimating a carrier phase $\phi_c$ from the results of step (l);

n) removing the estimated carrier phase of the correlation signals;
o) applying a Viterbi decoding algorithm to the results of step (n); and
p) estimating a transmitted data sequence from the results of step (o).

* * * * *